United States Patent [19]

Szwerc et al.

[11] Patent Number: 5,000,968

[45] Date of Patent: Mar. 19, 1991

[54] PROCESS FOR MAKING FILLED CRACKERS

[75] Inventors: Joseph Szwerc, Mahwah; Richard D. Fazzolaré, Randolph, both of N.J.

[73] Assignee: Nabisco Brands, Inc., East Hanover, N.J.

[21] Appl. No.: 240,199

[22] Filed: Sep. 6, 1988

[51] Int. Cl.$^5$ ............................................. A21D 8/00
[52] U.S. Cl. ...................................... 426/63; 426/94; 426/283; 426/446; 426/549; 426/808
[58] Field of Search .................. 426/94, 63, 808, 446, 426/549, 283

[56] References Cited

U.S. PATENT DOCUMENTS

| Re. 28,074 | 7/1974 | Smerak et al. | 426/20 |
| 1,179,877 | 4/1916 | Wahl et al. | |
| 1,817,114 | 8/1931 | Valenta | |
| 1,890,697 | 12/1932 | Scanlan | 426/446 |
| 2,875,064 | 2/1959 | Glabe | 426/63 |
| 3,167,432 | 1/1965 | Colby | 99/93 |
| 3,494,770 | 2/1970 | Smerak et al. | 426/63 |
| 3,527,644 | 9/1970 | Landfried et al. | 426/63 |
| 3,561,975 | 2/1971 | Luebering et al. | 99/94 |
| 3,666,485 | 5/1972 | Nelson et al. | 99/88 |
| 3,925,567 | 12/1975 | Abe | 426/559 |
| 4,202,911 | 5/1980 | Papantoniou et al. | 426/502 |
| 4,209,536 | 6/1980 | Dogliotti | 426/94 |
| 4,613,508 | 9/1986 | Shishido | 426/281 |
| 4,623,550 | 11/1986 | Willard | 426/808 |
| 4,752,493 | 6/1988 | Moriki | 426/446 |
| 4,770,891 | 9/1988 | Willard | 426/808 |

FOREIGN PATENT DOCUMENTS

| 2403746 | 4/1979 | France . |
| 53-59071 | 5/1978 | Japan . |
| 56-11540 | 2/1981 | Japan . |
| 63-49041A | 3/1988 | Japan . |

OTHER PUBLICATIONS

Matz, Cookie and Cracker Technology, AVI Publishing Co., Inc., 1968, pp. 104, 137–149.
Article by Faridi, 1143 Bakers Digest, vol. 54, Jun., No. 3 (1980).

*Primary Examiner*—Donald E. Czaja
*Assistant Examiner*—Mary S. Mims

[57] ABSTRACT

Crackers having a hollow interior and capable of being filled can be formed from a particular cracker dough. This cracker dough will contain a lower sugar content and shortening content than cookie or biscuit doughs. In order for the cracker dough to be used to form a hollow cracker, the dough must undergo treatment with proteolytic enzymes so as to selectively sever certain peptide linkages in the dough. This permits a hollow core to be formed upon the baking of the cracker rather than a cellular core. The hollow core of the cracker is filled using conventional needle injection techniques.

12 Claims, No Drawings

PROCESS FOR MAKING FILLED CRACKERS

BACKGROUND OF THE INVENTION

This invention relates to a process for making crackers which contain various fillings. More particularly, this invention relates to baking hollow crackers which can be injected with a filling. This invention also relates to filled hollow crackers.

It is known in the prior art to make a variety of filled bakery products. However, most of these products are of a soft consistency which permits for the easy filling of the interior cavity of the product. An example of such a product is the conventional cream puff pastry. Since these products have a soft shell they are rather easily filled with any desired filling. However, this is not the case with regard to hard items such as cookies, bread sticks and crackers. These latter types of food items have a tendency to crack and disintegrate when they are pierced by a needle which is to insert the filling into the product. Consequently other methods have been used in the past.

As an example, in U.S. Pat. No. 3,666,485 there is disclosed a method and apparatus for inserting a filling into bread sticks. The technique that is utilized is to remove one end of the bread stick, drill a hole downwardly into the center of the bread stick and then to insert the filling into this drilled hole. This will produce a bread stick which has a filling, however the process and equipment that are required considerably reduce the feasibility of commercially producing such a product.

U.S. Pat. No. 4,209,536 discloses a method for producing a filled food product which consists of a relatively hard outer surface which encloses a soft filling. The outer shell of this bakery product is produced utilizing egg white which is intimately and homogeneously distributed throughout the dough. No leavening agents are utilized. The structure of the pastry shell and the strength of the pastry shell is dependent on the use of egg white within the dough formulation. After the shell has been formed it can be pierced by a filling needle point and filled with a particular type of pastry filling.

U.S. Pat. No. 4,613,508 discloses a process for producing filled hard dough biscuits. In this patent there is described a process for producing biscuits which during the preparation process have a leavening increase of at least 280. This is accomplished by utilizing a particular dough composition. The dough composition consists of a cereal dough containing 10 to 30 parts by weight of sugar, 10 to 25 parts by weight of an edible fat or oil, and 20 to 35 parts by weight of water, all based upon 100 parts by weight of cereal flour. A leavening agent is desirably added in an amount of 2.0 to 4.0 weight and the dough is then rolled into a sheet. The sheet is alternately folded and rolled. The thus prepared dough sheet is then formed into various desired shapes and the formed shapes baked. During the baking process the percentage of leavening that occurs is at least 280. After the baked and expanded shapes leave the oven a nondough filling is inserted into the essentially hollow center of the biscuit.

The expanded biscuits which are described and disclosed in this patent are based upon a critical composition for the cereal dough that is utilized. It is stated in this patent that if the sugar content is increased to 40 parts by weight with the oil or fat content being 15 parts by weight, all based on 100 parts by weight of wheat flour, and the water content being 17 parts by weight the resulting baked product will be hard but structurally weak, and will give poor feeling during eating. In the instance where the cereal dough is prepared with an excess of oil or fat, as for example where the dough contains 25 parts by weight of sugar, 30 parts by weight of oil or fat and 16 parts by weight of water per 100 parts by weight of flour, the resulting baked product will be crumbly and very susceptible to breaking during the step of inserting the needle into the biscuit to insert the filling. The same effect will occur if the water content of the dough is increased to compensate for a decreased proportion of sugar and/or oil or fat. The preferred ranges for the dough components in this patent are 10 to 30 parts by weight of a sugar, 10 to 25 parts by weight of an oil or a fat, and 35 to 20 parts by weight of overall water, all per 100 parts of weight of the cereal flour.

In essence this patent provides a teaching that a dough that would be utilized for the production of crackers is not the type of a dough that can be used to make dough products similar to those of the patent. This however is not the case if the present process is utilized. When the present process is utilized a cracker dough can be effectively used to make expanded and shaped items wherein the shell has sufficient strength and integrity to withstand the insertion of a needle to thereby insert a filling into the expanded cracker. By using the present process there does not result a cellular internal structure with a plurality of voids, but rather a cracker that is essentially hollow and which can be filled with a suitable filling by means of needle injection.

BRIEF SUMMARY OF THE INVENTION

It has been found that shaped and expanded snack food items can be prepared from a cracker dough. The cracker dough based on 100 parts by weight of flour will contain about 6 to 9 parts by weight of shortening, about 3 to 9.5 parts by weight of sugar, and about 0 to 4 parts by weight of a syrup such as high fructose corn syrup. Other syrups including honey can be used. The dough will also contain about 0.75 to about 1.4 parts by weight of leavening agent based on the weight of the dough. The proteolytic enzymes that are utilized will be present in a minor amount, but in an amount sufficient to sever protein bonds in the flour before and during the dough leavening.

During the mixing of the components water is added in an amount of about 28 to 32 parts by weight. After the dough has been mixed, in a preferred method of preparation, it is proofed for about 1.5 to 4.5 hours and then remixed to distribute the evolved carbon dioxide throughout the mixture. After remixing the dough is optionally proofed for a second period of from about 0.5 to about 1.5 hours. However, this second proofing is not needed in all instances. Further, certain modifications can be made to various processing steps and yet produce a dough that will result in a hollow center when baked. The dough is then sheeted and various forms of the dough to be baked are cut from the sheeted dough. During sheeting the dough is passed through rotating rolls and several of the resulting sheets of dough overlayed one onto the other to form a type of a dough laminate. The number of such overlayed sheets range from about 2 to 5. The individual cut forms are then passed through an oven set at a temperature of about 350° F. to about 600° F. for a period of time of about 2 to 10 minutes. While in the oven the forms expand while being baked with a hollow cavity being formed within the baked form. The baked and expanded forms then exit the oven and are passed to a station while warm for the filling of the hollow cracker forms. However, it is not necessary that the hollow cracker forms be warm while being filled. This is accomplished utilizing a filler needle assembly which pierces the hollow cracker form and which injects the filling into the hollow cavity of each cracker. Optionally, before or after the filling of the cracker form the cracker form can be sprayed with an oil or other substance.

It is important that the proteolytic enzymes be a part of the dough mixture. The leavening agent is also an important component. The proteolytic enzymes hydrolyze proteins of the flour which it is believed relaxes the dough and thereby permits a hollow center to be formed rather than a cellular center as the cracker expands under the influence of the leavening agent during baking. This then strengthens the shell of the cracker and permits the cracker to be filled by means of an injection needle piercing the surface of the cracker.

The product that is formed is an essentially hollow cracker which contains a filling such as cheese, peanut butter, a vegetable flavored filling, a meat flavored filling, a seafood flavored filling, a fruit filling, a flavored cream filling, a chocolate filling as well as various fat and sugar fillings. Essentially any filling that can be incorporated using needle injection techniques can be utilized.

DETAILED DESCRIPTION OF THE INVENTION

An important part of the process for making the present filled cracker snack products involves the making of a hollow shaped cracker which has sufficient strength so that it can be filled with a filling using a needle injection technique. When needle injection is used to insert a filling into a baked item, and in particular into a hard shell baked item, the shell must be strong enough to withstand the penetration of the injection needle. If the shell does not have sufficient strength the cracker will crack or break when contacted by the needle. This will create significant problems on a manufacturing line. Consequently, it is important that the shaped crackers besides being hollow have a shell structure that is sufficiently strong to withstand the filling procedures, and in particular the penetration of a filling needle. Such a process has been found. Through the utilization of fast acting proteolytic enzymes the protein structure of a cracker dough can be sufficiently weakened so that upon baking a hollow core structure is formed rather than a cellular core structure. Also there results a hard shell that can withstand being pierced by a needle. The dough that is utilized to make the filled crackers will contain less than 10 parts by weight of sugar and less than 15 parts by weight of shortening based on 100 parts of weight of flour. Preferably the dough comprises, based on 100 parts by weight of flour, about 6 to 9 parts by weight of a fat or shortening, about 3 to 9.5 parts by weight of sugar and about 0 to 4 parts by weight of a syrup such as high fructose corn syrup. Other syrups including honey can be used. Preferably the shortening is a vegetable based shortening. In a more preferred mode the sugar will preferably be comprised of about 4 to 9 parts by weight of sugar, and about 0 to 2 parts by weight of high fructose corn syrup. The dough composition will also contain an edible emulsifier such as lecithin. The dough will in addition contain about 0.75 to 1.4 parts by weight of a leavening agent, and preferably a chemical leavening agent. Essentially any chemical leavening agent that will evolve carbon dioxide can be used. The proteolytic enzymes that are added to the dough are added in an amount of about 0.01 grams to about 0.5 grams pure basis based on a dough mass of 100 pounds. The exact amount used will depend on the particular flour, the amount of leavening agent used and the particular sources of the enzymes. Papain is a preferred enzyme. Proteolytic enzymes are typically available in a purity of about 5 percent by weight. Another method of designating the amount of enzymes added is by designating activity in Northrup Units. In this regard the proteolytic enzymes will be added in an amount of about 600 to 1800 Northrup Units per 100 pounds of flour. During the mixing of the dough from about 28 to 32 parts by weight of water is added to form the dough.

The dough ingredients can be mixed in essentially any order. However, it is preferred to first mix the shortening with the sugar, high fructose corn syrup or other syrup when it is to be present, the acidic component of the leavening agent, such as calcium acid phosphate, and most of the water. The flour and basic component of the leavening agent, such as sodium bicarbonate, and the proteolytic enzymes are then added. The dough is mixed until the components are evenly distributed throughout the dough mixture. Depending on the type of mixer that is used this will take from about 4 to 20 minutes. After mixing the dough is proofed for from about 1.5 to about 4.5 hours. During proofing the leavening agent is evolving carbon dioxide which serves to expand the dough mass. Proofing is conducted at a temperature of about 70° F. to about 100° F. and preferably at about 80° F. to about 95° F. In a preferred method after proofing the dough is remixed in order to redistribute the carbon dioxide throughout the dough. However, this is not necessary. After remixing, if this step is incorporated into the process, the dough is optionally proofed a second time. This second proofing, when it is used, is for a period of about 0.5 to about 1.5 hours. The range of temperatures that can be used for a second proofing is the same as the range utilized in the first proofing.

After proofing, the dough is now in a condition to be formed into the desired shapes and baked. Essentially any technique can be used to form the dough into the desired shapes. The preferred technique is to form the dough into a laminated sheet by means of a laminator and sheeting rolls or reduction rolls. The dough is passed through one or more sets of rotating rolls. Then the dough can be doubled back onto itself prior to passage through the next set of rolls. The dough will preferably have three or more dough layers, or six or more dough surfaces. The last set of sheeting rolls will lay the laminated dough down onto a table or conveyor belt where the laminated dough can be formed by cutting into a plurality of shaped pieces for baking. The dough pieces are preferably not dockered, that is, they do not have holes so that they can expand uniformly and form a uniform hollow cavity.

Each of the shaped pieces is then conveyed into a conventional baking oven where they are baked from about 2 to 10 minutes. The baking time will depend on the dough composition and the temperature of the oven among other factors. The oven temperature will range form about 350° F. to 600° F. After baking the now expanded crackers are passed to a station where the filling is inserted. The filling can be inserted while the cracker is still in a heated condition but this is not necessary. In filling the baked crackers it is preferred that the filling needle penetrate the side of the cracker that was in contact with the oven surface during baking. This side of the baked cracker has unexpectedly been found to have a higher strength than the other side of the cracker. Further the other side in many instances will contain a fanciful design that would be marred by the penetration of the needle.

It is the leavening agents that provide for the expansion of the cracker during baking. Chemical leavening agents are preferred and essentially any chemical leavening agents can be used. The usual chemical leavening agents are carbonates and bicarbonates. During baking carbon dioxide is evolved upon the decomposition of the carbonates and bicarbonates which expands the cracker form to several times its original size. Preferably at least fifty percent of the leavening occurs during baking. Due to the prior action of the proteolytic enzymes, during this expansion the dough does not form a cellular internal structure, but rather forms a hollow structure. In addition this dough that would be distributed throughout a cellular structure becomes a part of the shell. This strengthens the shell of the cracker while providing a larger internal cavity for the filling.

As has been previously set forth essentially any type of a filling can be inserted into the cracker. These can be cheese fillings, peanut fillings, vegetable flavored fillings, meat flavored fillings, seafood flavored fillings, fruit fillings, flavored creams, chocolate, fat or sugar based fillings. There is essentially no limitation with regard to the filling that can be incorporated.

The laminated dough can be formed into essentially any shape prior to the step of baking. These can be the shapes of animals or persons, in the shapes of flowers, trees, toys, stars or the like. Designs can also be impressed into or printed onto the dough shapes prior to baking and this design will be a part of the end product hollow shape.

The present invention will be described in further detail in the following example.

EXAMPLE

Based on 100 pounds of wheat flour, the ingredients are as follows:

| | |
|---|---|
| Shortening | 8.5 pounds |
| Emulsifier | 0.375 pounds |
| Barley Flour | 0.0875 pounds |
| Granulated Sugar | 6 pounds |
| Salt | 0.75 pounds |
| Sodium Bicarbonate | 0.75 pounds |
| Calcium Acid Phosphate | 0.625 pounds |
| Proteolytic Enzymes | 0.007 pounds |
| Water | 32 pounds |

The shortening, emulsifier, granulated sugar, salt, calcium acid phosphate and water are added to a dough mixer and mixed until fully blended. The mixture of wheat flour, barley flour, sodium bicarbonate is then added to this mixture followed by the addition of the proteolytic enzymes dispersed in a small amount of water. This is mixed for about 8 minutes. After mixing, the dough is proofed for about 3 hours. Following this proofing the dough is mixed for 1 minute and proofed again for 1 hour. The dough is now machined so that it can be cut into the desired shapes.

Machining consists of rolling the dough and folding the dough over onto itself to form a multilayered laminate of the dough. The dough is then sheeted to the correct thickness and cut into the desired shapes. The shapes are then fed to the oven where they are baked at 410° F. to form a hollow cracker. The baked crackers are then conveyed from the oven and filled with a filling by needle injection.

What is claimed is:

1. A process for making filled crackers comprising:
   (a) forming a dough comprising a flour, at least one sweetening substance, at least one shortening, and at least one leavening agent;
   (b) treating said dough with an effective amount of at least one proteolytic enzyme for a sufficient period of time to produce a hollow, non-cellular structure upon baking;
   (c) forming said dough into a laminated sheet;
   (d) forming the laminated dough sheet into shapes;
   (e) baking the shapes to produce essentially hollow expanded shapes; and
   (f) injecting a non-dough filling into each of said shapes.

2. A process for making filled crackers as in claim 1 wherein based on 100 parts by weight of flour said dough has a sugar content of less than about 10 parts by weight, and a shortening content of less than about 15 parts by weight.

3. A process for making filled crackers as in claim 2 wherein said dough has a sugar content of from about 3 parts to about 9.5 parts by weight, a shortening content of from about 6 parts to about 9 parts by weight, and a water content of from about 28 parts to about 32 parts by weight.

4. A process for making filled crackers as in claim 2 wherein said dough contains 0.75 to 1.4 parts by weight of a leavening agent.

5. A process for making filled crackers as in claim 4 wherein said leavening agent is comprised of a chemical leavening agent that evolves carbon dioxide.

6. A process for making filled crackers as in claim 1 wherein at least one of said proteolytic enzymes is papain.

7. A process for making filled crackers as in claim 1 wherein said proteolytic enzymes are present in an amount of from about 600 to 1800 Northrup units per 100 pounds of flour.

8. A process for making filled crackers as in claim 1 wherein after the addition of said proteolytic enzyme to said dough said dough is allowed to set for from about 1.5 to 4.5 hours.

9. A process for making filled crackers as in claim 8 wherein after said dough sets said dough is mixed to provide an even gas distribution therein.

10. A process for making filled crackers as in claim 9 wherein after mixing said dough to provide an even gas distribution said dough is allowed to set for a second period of time of from about 0.5 hours to 1.5 hours.

11. A process for making filled crackers as in claim 1 wherein the filling is selected from the group consisting of cheese, peanut butter, vegetable flavored fillings, meat flavored fillings, seafood flavored fillings, fruit, chocolate and flavored creams.

12. A process for making filled crackers comprising:
   (a) forming a cracker dough from flour, at least one sweetener, at least one shortening, at least one chemical leavening agent and at least one proteolytic enzyme in the amount of about 600 to about 1800 Northrup Units per 100 lbs of flour;

(b) proofing the dough for sufficient time to produce a dough which forms a hollow structure upon baking;

(c) laminating the dough into a dough sheet;

(d) shaping the laminated dough sheet into pieces;

(e) baking the pieces at a sufficient temperature and for a sufficient time to form a substantially hollow non-cellular baked product; and (f) filling the baked product with a non-dough filling.

* * * * *